(12) United States Patent
Fisher et al.

(10) Patent No.: US 6,571,286 B2
(45) Date of Patent: *May 27, 2003

(54) METHOD AND SYSTEM FOR ENHANCING COMMUNICATIONS EFFICIENCY IN DATA COMMUNICATIONS NETWORKS

(75) Inventors: Bradford Austin Fisher, Carrboro, NC (US); Kent Fillmore Hayes, Jr., Chapel Hill, NC (US); Anthony Brian O'Hare, Green Bay, WI (US); Charles Ray Saylor, Raleigh, NC (US)

(73) Assignee: International Business Machines Corporation, Armonk, NY (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 14 days.

(21) Appl. No.: 09/111,546

(22) Filed: Jul. 7, 1998

(65) Prior Publication Data

US 2002/0013847 A1 Jan. 31, 2002

(51) Int. Cl.[7] .............................................. G06F 19/00
(52) U.S. Cl. ...................... 709/224; 709/227; 370/254
(58) Field of Search ............................... 709/202, 200, 709/220, 222, 224, 228, 227; 370/469, 254, 255; 455/426

(56) References Cited

U.S. PATENT DOCUMENTS

| 5,165,018 A | 11/1992 | Simor ............................. 714/4 |
| 5,193,152 A | 3/1993 | Smith .......................... 709/220 |
| 5,291,488 A | 3/1994 | Jestice et al. ................. 709/202 |
| 5,295,139 A | 3/1994 | Palmer ......................... 370/469 |
| 5,430,727 A | * 7/1995 | Callon ....................... 370/85.13 |
| 5,459,713 A | 10/1995 | Curtis .......................... 709/243 |
| 5,491,822 A | * 2/1996 | Allen et al. .................... 709/201 |
| 5,509,123 A | 4/1996 | Dobbins et al. ............. 370/255 |
| 5,548,585 A | 8/1996 | Lagoutte et al. ............. 370/255 |
| 5,561,769 A | 10/1996 | Kumar et al. ................ 370/254 |
| 5,574,860 A | 11/1996 | Perlman et al. ............. 709/220 |
| 5,594,780 A | * 1/1997 | Wiedeman ..................... 379/59 |
| 5,610,910 A | * 3/1997 | Focsaneanu ................. 370/351 |
| 5,652,908 A | 7/1997 | Douglas et al. ............. 709/222 |
| 5,737,333 A | * 4/1998 | Civanlar ...................... 370/352 |
| 5,790,548 A | * 8/1998 | Sistanizadeh ................ 370/401 |
| 5,842,125 A | * 11/1998 | Modzelesky ................. 455/426 |
| 5,856,974 A | * 1/1999 | Gervais ........................ 709/224 |
| 5,872,928 A | 2/1999 | Lewis et al. ................. 709/222 |
| 6,041,347 A | * 3/2000 | Harsham et al. ............ 709/220 |

OTHER PUBLICATIONS

IBM Technical Disclosure Bulletin, "Efficient, Real–Time Address Resolution In Backbone Networks of General Topology", vol. 36, No. 03, Mar. 1993, pp. 133–139.

IBM Technical Disclosure Bulletin, "Large–Scale Configuration of Peer–To–Peer Communicating Workstations", vol. 33, No. 6A, Nov. 1990, p. 246.

\* cited by examiner

*Primary Examiner*—Ayaz Sheikh
*Assistant Examiner*—Khanh Quang Dinh
(74) *Attorney, Agent, or Firm*—Gerald R. Woods; Bracewell & Patterson, LLP (57) ABSTRACT

A method and system for use within at least one network. The method and system achieve their objects via computing equipment engineered to do the following: define one or more pools of network resources; and assign network resources on the basis of the one or more pools of network resources.

11 Claims, 5 Drawing Sheets

Exclusive and non-exclusive Sub-Pools (exclusive sub-pools)

(non-exclusive sub-pools)

FIG. 3
Exclusive and non-exclusive Sub-Pools

FIG. 4
Pre-populated vs. Ad Hoc Resource Pools

FIG. 5

Non-distributed vs. Distributed Pre-populated Resource Pools

METHOD AND SYSTEM FOR ENHANCING COMMUNICATIONS EFFICIENCY IN DATA COMMUNICATIONS NETWORKS

BACKGROUND OF THE INVENTION

1. Technical Field

The present invention is related to a method and system to be utilized in data communications. In particular, the present invention is related to a method and system to be utilized in data communications involving at least one data communications network.

2. Description of the Related Art

Data communications is the transfer of data from one or more sources to one or more sinks that is accomplished (a) via one or more data links between the one or more sources and one or more sinks and (b) according to a protocol. Weik, *Communications Standard Dictionary* 203 (3rd ed. 1996). A data link is the means of connecting facilities or equipment at one location to facilities or equipment at another location for the purpose of transmitting and receiving data. Weik, *Communications Standard Dictionary* 206 (3rd ed. 1996). A protocol, in communications, computer, data processing, and control systems, is a set of formal conventions that govern the format and control the interactions between two communicating functional elements in order to achieve efficient and understandable communications. Weik, *Communications Standard Dictionary* 770 (3rd ed. 1996).

A data communications network is the interconnection of three or more communicating entities (i.e., data sources and/or sinks) over one or more data links. Weik, *Communications Standard Dictionary* 618 (3rd ed. 1996).

Data communications networks connect and allow communications between multiple data sources and sinks over one or more data links. The concept of a data link includes the media connecting one or more data sources to one or more data sinks, as well as the data communications equipment utilizing the media. The data communications networks utilize protocols to control the interactions between data sources and sinks communicating over the one or more data links. Thus, it follows that such protocols must take into account the data communications requirements of data sources and sinks desiring communication over the one or more data links, and the nature of the underlying one or more data links themselves, in order to ensure that the requirements of such data sources and sinks are met.

Of necessity, data communication protocols must take into account both the technology of the underlying data links and the data source and sink communications requirements. The underlying data links, data source, and data sink communications requirements give rise to a high degree of complexity.

It has been found that the complexity can be reduced to a manageable level by modularizing the concepts of data communication, as reflected in data communication network protocols. One such well-known modular approach is the International Standards Organization's Open Systems Interconnections (OSI) 7 layer (or level) model.

Those skilled in the art will recognize that data communication protocols exist which do not follow the OSI model exactly. However, insofar as the OSI model is a conceptual model dealing with the problem of network communications, non-OSI models still provide the same functionalities of the OSI model, although the terminology utilized in such protocols may be different from OSI terminology. Notwithstanding the foregoing, the OSI model still provides the most straightforward conceptual approach to the problems involved in network communication, and thus the OSI 7 layer model will be utilized, below, to discuss communications problems which exist in the art. Furthermore, while the OSI model does have seven layers, the first, second, and third levels will be most relevant to the detailed description to follow.

OSI Level 1 is the physical level, and deals with the true electrical signals and electrical circuits that are utilized to carry information. OSI Level 2 is known as the data link layer (or service layer interface/media access control layer when reference is made to a LAN context) and is a conceptual level whereby access to the physical level (OSI Level 1) is actually controlled and coordinated. A good example of OSI Level 2 is LAN protocol, which coordinates and controls access to the physical layer (OSI Level 1), or media over which actual transmission occurs, by use of data frames (packages of binary data) to which are appended headers containing a source address and a destination address. In LAN terminology, these addresses are referred to as media access control (MAC) addresses.

OSI Level 2 deals with access and control of actual media over which data is transmitted. Physical constraints often put an upper limit on the number of stations that can be physically connected (at OSI Level 1). OSI Level 2 defines ways that multiple discontinuous OSI Level 1, or physical, segments can be stitched together to achieve what appears to be one large coherent (or contiguous) network. The OSI Level 2 achieves this by managing "bridges" between physical segments. In Ethernet LAN, these bridges are termed transparent bridges, and in token-ring LAN these bridges are termed source-route bridges.

Conceptually one step removed from OSI Level 2 is OSI Level 3, the network layer. While OSI Level 2 frees network designers from dealing with the actual physical connections of the underlying networks, OSI Level 2 logic must still take into account the actual physical structure of the underlying physically connected networks.

Conceptually, network designers tend to prefer to work with networks that have a certain defined logical structure, which may be different from the underlying physical connections of the network. Consequently, OSI Level 3 has been developed. OSI Level 3 allows network designers to treat what may, in fact, be a tremendously large number of non-contiguous network segments strung together by OSI Level 2 entities as one large homogenous network with a logical structure different than that of the underlying physical network (which must be dealt with by the OSI Level 2 logic). That is, OSI Level 3 allows network designers to create a conceptual network with a defined conceptual structure, and to thereafter refer to one network level protocol defined set of addresses (e.g., using OSI Level 3 logic to define and operate a logical token ring structure over an actual network that may, from a physical standpoint, have the structure of an Ethernet network).

The foregoing is achieved by defining the conceptual network at OSI Level 3. Thereafter, OSI Level 3 entities exchange the defined conceptual network addresses with OSI Level 2 entities, which actually figure out where such network addresses are to be located on a true physical network. Thus, OSI Level 3 working with and through OSI Level 2, allows network designers to impose logical structure onto what may look like physical chaos.

OSI Level 2 entities typically achieve the foregoing by "mapping" the OSI Level 3 network addresses onto OSI Level 2 service layer addresses. Thus, when an OSI Level 3 entity passes a network layer address to an OSI Level 2 entity, the OSI Level 2 entity typically uses a look-up table to convert the OSI Level 3 address into its OSI Level 2 equivalent.

Figure 1:
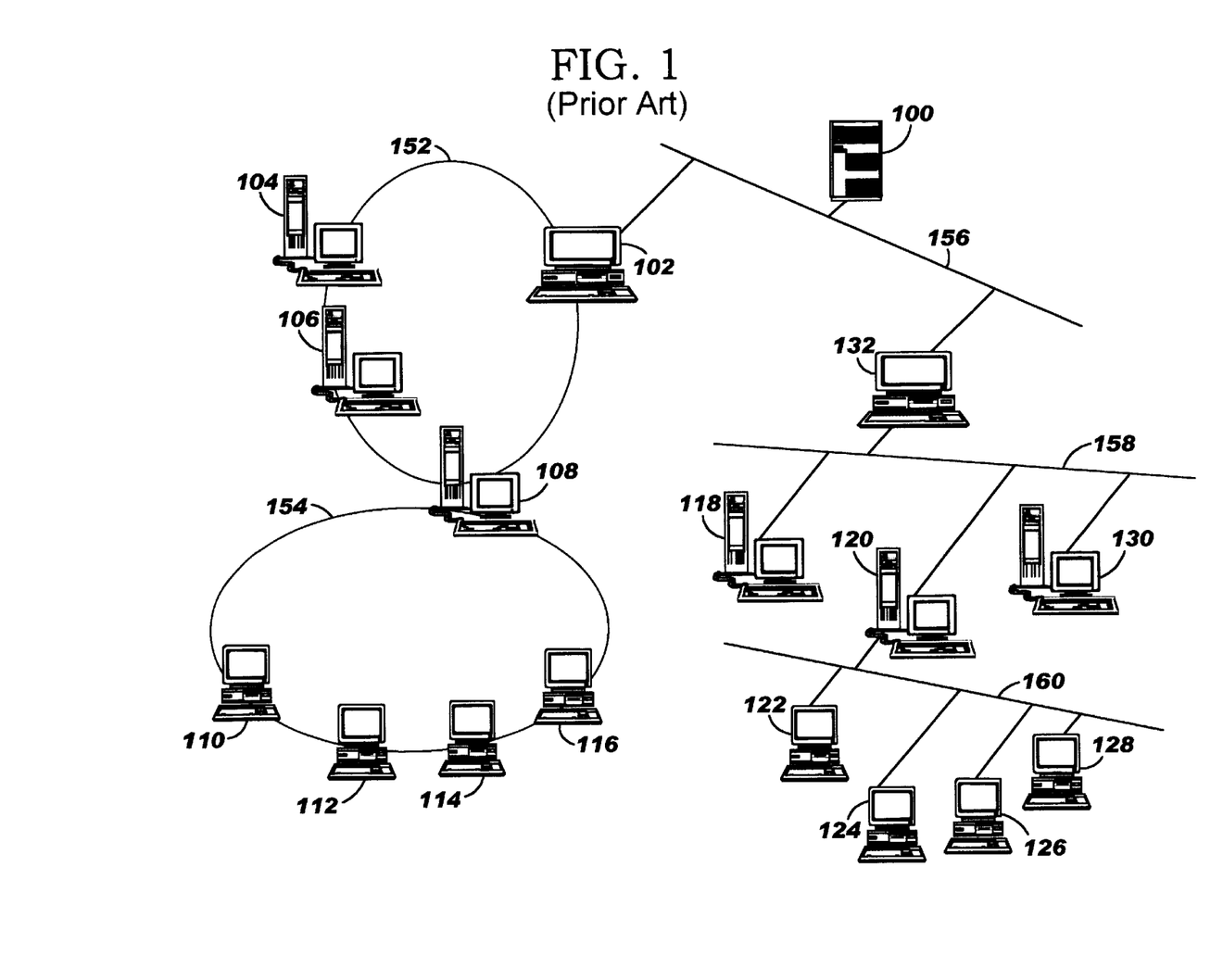
FIG. 1 shows a high-level schematic view of the physical connections of a networked computer environment within which one embodiment of the present invention can function.

Refer now to FIG. 1. FIG. 1 shows a high-level schematic view of the physical connections of networked computer environment within which one embodiment of the present invention can function. Shown in FIG. 1 are computers 100–132.

Shown are computers 100–116 which are physically connected in ring structures. Computers 102–108 are physically connected in ring structure 152. Computers 108–116 are physically connected in ring structure 154.

Computers 100, 102, 132 are physically connected via shared media 156. Computers 132, 130, 120, 118 are physically connected via shared media 158. Computers 120, 128, 126, 124, 122 are physically connected via shared media 160.

As can be seen from FIG. 1, networked computers can present a dizzying array of connections and a high degree of complexity. Furthermore, those skilled in the art will recognize that in practice the number of interconnected computers is virtually infinite (present networks contain computers numbering into the millions) and, likewise, the number of physical interconnections between individual computers can also number into the millions (present networks have interconnects numbering into the millions). The question arises as to how this welter of confusion can be made to yield an efficient and robust communications system.

In the main, network engineers have been able to tame this complexity by using software/firmware/hardware to impose a logically coherent structure onto the physically jumbled networks. One way in which this is done is illustrated in FIG. 2; however, those skilled in the art will recognize that there are many other ways of imposing such logical order.

Figure 2:
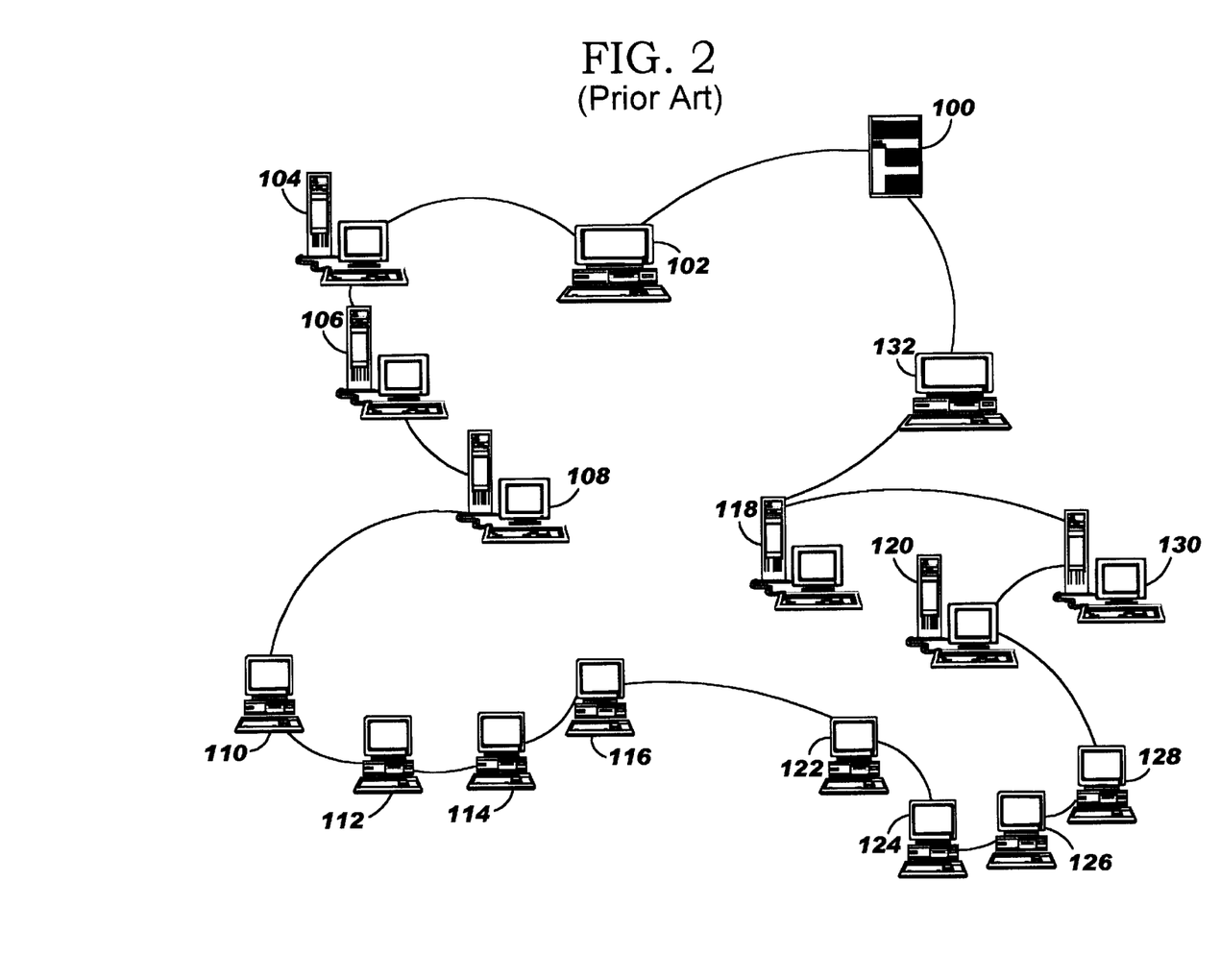
FIG. 2 depicts a high-level schematic view of a first logical topology assigned to the network of FIG. 1 by a designer.

Refer now to FIG. 2. FIG. 2 depicts a schematic view of a logical token-ring topology assigned to the network of FIG. 1 by a designer. Shown are computers 100–132. However, in FIG. 2 it is shown that via the use of hardware/firmware/software, a logical network topology has been created in which computers 100–132 form the logical construct token ring LAN 200. That is, the underlying physical structures of FIG. 1 are still extant, but the logical construct token ring LAN 200 allows network designers/administrators to ignore that underlying structure and treat computers 100–132 "as if" they were in fact members of one continuous token ring 200.

In order to manage the conceptual network (e.g., the OSI Level 3 logical construct) of FIG. 2, it is necessary for the network devices (e.g., computers and their associated peripherals) to have been assigned network addresses by a network manager. Furthermore, as devices come on-line and off-line, these network addresses must be adjusted such that the network management is kept efficient and current. Furthermore, those skilled in the art will recognize that tracking such network addresses is tedious and is generally done under the current state of the art on an ad hoc basis by a network administrator.

Even given the power of OSI Level 3 to create a large virtual network using disparate physical structures and OSI Level 2 bridges, situations often arise where circumstances or network design factors give rise to the need for more than one OSI Level 3 virtual network. In such cases, OSI Level 3 routers are utilized to seamlessly stitch together more than one OSI Level 3 networks.

OSI Level 3 routers usually serve as the interconnection point between at least two OSI Level 3 virtual networks. However, in addition to their function as OSI Level 3 routers, such network nodes also often do "double duty," serving as a network point of penetration for one or more users. In practical terms, what this means is that such OSI Level 3 network routers are called upon to both pass data up (e.g. into the OSI Level 4 Transport level) the protocol stack to end users, as well as buffer and retransmit data when data received is to be routed through the OSI Level 3 router, because the network address indicates that the data is destined for another node on another network.

It is not uncommon for a tremendous number of OSI Level 3 virtual networks to be strung together by use of several network routers. It is further not uncommon for the need to arise for communications between data sources and sinks separated from each other by several OSI Level 3 networks and routers. Consequently, in such cases multiple networks must be interconnected by multiple network routers in order for effective communication to take place between the data source and sink.

When more than one OSI Level 3 virtual networks are strung together, the network management problems, noted above, for managing the network addresses are still present. However, the increased number of networks makes the management of the network addresses that much more complex. For example, coordinating and ensuring that redundant network names and addresses across one network can prove to be a daunting task, and when many networks are possible a coherent solution is often not possible under the current state of the art.

Restated, as communications networks continue to increase in both size and complexity, the task of creating and maintaining the associated network configuration data becomes increasingly difficult and error prone.

A major source of this difficulty lies in the fact that devices comprising these networks are configured individually, one at a time. The typical configuration tool does not provide any support for managing the configuration for groups of devices. This means that the coordination of configuration data among multiple devices is left to the end-user. A key aspect of coordinating the configurations among different devices in the same network is the management of critical configuration resources such as IP addresses.

In addition to the foregoing, those skilled in the art will recognize that new (non-OSI) types of network protocols (such as Asynchronous Transfer Mode (ATM), or Synchronous Optical Network (SONET)) have emerged that do not, in their native form, support the standard well-developed OSI Level 2 and 3 protocols. However, due to the tremendous installed base of OSI-type networks (e.g., Wide Area Networks (WANs), Local Area Networks (LANs), Internet Protocol Networks), such non-OSI networks have been forced to provide emulation of OSI-type networks. Typically, such emulation has been provided by providing an "overlay" of software and computational equipment which support the well-defined protocols by accepting data units and doing very fast translations between the disparate protocols. Such operations are virtually always performed at both endpoints of a communication connection as well as at the intermediate nodes between the endpoints. Such emulation overlays merely compound the previously discussed problems associated with managing the network resources.

It is therefore apparent that a need exists for a method and system, to be utilized in data communications involving at least one data communications network, which provide dynamic and coherent management of network resources.

SUMMARY OF THE INVENTION

It is therefore one object of the present invention to provide a method and system to be utilized in data communications.

It is therefore another object of the present invention to provide a method and system to be utilized in data communications involving at least one data communications network.

It is yet still another object of the present invention to provide a method and system, to be utilized in data communications involving at least one data communications network, such that the method and system provide efficient, coherent, and dynamic management of the resources of the data communications network.

The foregoing objects are achieved as is now described. Provided are a method and system for use within at least one network. The method and system achieve their objects via computing equipment engineered to do the following: define one or more pools of network resources; and assign network resources on the basis of the one or more pools of network resources.

The above as well as additional objects, features, and advantages of the present invention will become apparent in the following detailed written description.

BRIEF DESCRIPTION OF THE DRAWINGS

The novel features believed characteristic of the invention are set forth in the appended claims. The invention itself however, as well as a preferred mode of use, further objects and advantages thereof, will best be understood by reference to the following detailed description of an illustrative embodiment when read in conjunction with the accompanying drawings, wherein:

DETAILED DESCRIPTION OF ILLUSTRATIVE EMBODIMENT

In the following detailed description, like parts are indicated by like numbers. Furthermore, the first digit of each reference numeral generally relates to the figure wherein the primary description of that reference numeral appears. For example, 1xx would have its primary description in relation to FIG. 1, 2xx in relation to FIG. 2, 3xx in relation to FIG. 3, and so forth.

The present invention discloses a general-purpose solution that allows any number of network resources (e.g., MAC, IP, and ATM address, host names, ELAN names, etc.) to be automatically allocated, listed, checked for uniqueness, and otherwise managed. It is very likely that vendors and users of complex network devices such as routers will find such automatic allocation and management of network resources to be invaluable.

There are two primary elements to one embodiment of the present invention, which exists in the form of a "configuration tool," method and system which can be implemented in hardware, software, firmware, or any combination of the foregoing in a manner well-known to those within the art. The first element consists of a configuration tool method and system capable of providing support for configuring multiple network devices. This element of the configuration tool method and system allows the maintenance of information about critical network resources allocated to different devices. The second element consists of a configuration tool method and system capable of providing network resource management.

Referring again to FIG. 2, it can be seen that each computer 100–132 (and their associated peripherals, not shown), can be viewed as a network device. Each network device has associated network parameters that must be properly configured by the network administrator such that efficient network management and communications occurs.

Within the context of the present description, a network resource is treated as one of a finite set of values of a specific type, such as IP addresses, that can be assigned to a network device configuration parameter. For example, an IP address is a resource but the size of a buffer is not (because such is typically not considered a "network" resource, but is rather typically a resource of a network device). Resource management in a configuration tool method and system is a facility for maintaining sets of resources and controlling their assignment to configuration parameters. Resource management preferably supports the following high-level functions: (1) automatically allocating resources to specific configuration parameters; (2) listing existing resources for end-user selection as a value for a configuration parameter; (3) detecting duplicate resources; and (4) associating end-user supplied mnemonics with resources.

Some of the issues that arise in the context of resource management include: (1) determining which resources can be assigned to a given parameter; (2) differentiation between assigned and unassigned resources; (3) allowing end-users to create resources (by entering a value for a given parameter or declaring a set or range of values that can be assigned); and (4) determining when a parameter must be assigned a new (unassigned) resource and when it must be assigned a reference to a previously assigned resource.

The following discussion presents embodiments of the present invention by first describing the main structural elements utilized by the embodiments to provide network resource management. After the main structural elements have been defined, how the main structural elements are utilized will be set forth. Lastly, how the main structural elements are created and maintained will be set forth.

I. Main Structural Elements

A. Resources

A resource is a value that can be assigned to some parameter. The type of resource must match the type of parameter to which is it is assigned. A resource is said to be allocated if it has been assigned to some configuration parameter. Unassigned resources are referred to as being unallocated. Unallocated resources are either "created" by the end-user or, in some cases, they are created automatically by the tool as a result of the declaration in a Configuration Specification file. A Configuration Specification file is essentially a data file that contains information on things like parameters, parameter interdependencies, parameter resources, resource pools, how to populate resource pools, and the association between a parameter and a resource pool. Each resource is a member of a homogeneous set of values called a resource pool.

B. Resource Pools

The basic construct used in resource management is the Resource Pool. A resource pool (or simply "pool") is a homogeneous set of values (or resources) of a specific type such as IP address or Super Emulated LAN (ELAN) identifier. A resource pool acts as both a container of resources to be allocated and a repository of allocated resources. That is, there are no pools for allocated resources separate from pools for unallocated resources (the allocation state, allocated or unallocated is an attribute of each resource). Abstractly, the type of the given resource represents a globally defined resource pool. The need for establishing subsets of resources arises when we consider the fact that different parameters require values of the same type but are conceptually different. For example, it would be useful to distinguish among IP addresses assigned to "Router ID" parameters vs. those assigned to "ARP Server IP Address" parameters. This is accomplished by defining separate subsets (called sub-pools) for each of these classes of IP addresses.

C. Sub-Pools

The unit of lexical scope for resource pools is the sub-pool. A sub-pool is simply a partition of a resource pool. Such partitions allow end-users to manage uniqueness constraints (via scope) and predefined groups of resources. For example, a pool of ATM selector bytes might be partitioned into separate sub-pools, one for each device being configured. In this case, the scope of each sub-pool is a device (i.e., selector bytes are unique within a device but not across devices). Similarly, the sub-pool of device selector bytes might be further partitioned into a sub-pool for LAN Emulation (LANE) selector bytes and a sub-pool for Classical IP selector bytes. In this case, each sub-pool represents a logical grouping that the product developer considers significant.

Thus, a pool declaration may define a resource pool hierarchy using this notion of the sub-pools. All pools in a given resource pool hierarchy must be the same value type as the root pool (i.e., the pool that is that the root of the hierarchy). Note that all pool hierarchies are considered to be independent. That is, the resources and sub-pools within one pool hierarchy cannot be shared with any other pool hierarchy. Thus, the same resource and/or sub-pool names or identifiers can appear in more than one pool hierarchy but the names or identifiers are not correlated with the same object. While only one pool hierarchy should be required for a given value type (e.g., IP addresses), it is possible to create more than one pool hierarchy for the same value type. This would be advantageous in the case where the same resource could be allocated more than once. Note that this allows the potentially confusing situation where there are two resources with the same name and different pool hierarchies and one is allocated while the other is unallocated.

A sub-pool may be either an exclusive sub-pool or a non-exclusive sub-pool. An exclusive sub-pool is one that has no intersection with other sibling sub-pools. That is, if a pool has an exclusive sub-pool then none of its other sub-pools (at the same level in the pool hierarchy) may contain any of the same resources that are in the exclusive sub-pool. A non-exclusive sub-pool allows overlapping sub-pools. That is, non-exclusive sub-pools may contain the same resource. For example, since ESIs used for LANE can also be used for Classical IP, non-exclusive sub-pools would be used to represent this relationship.

Figure 3:
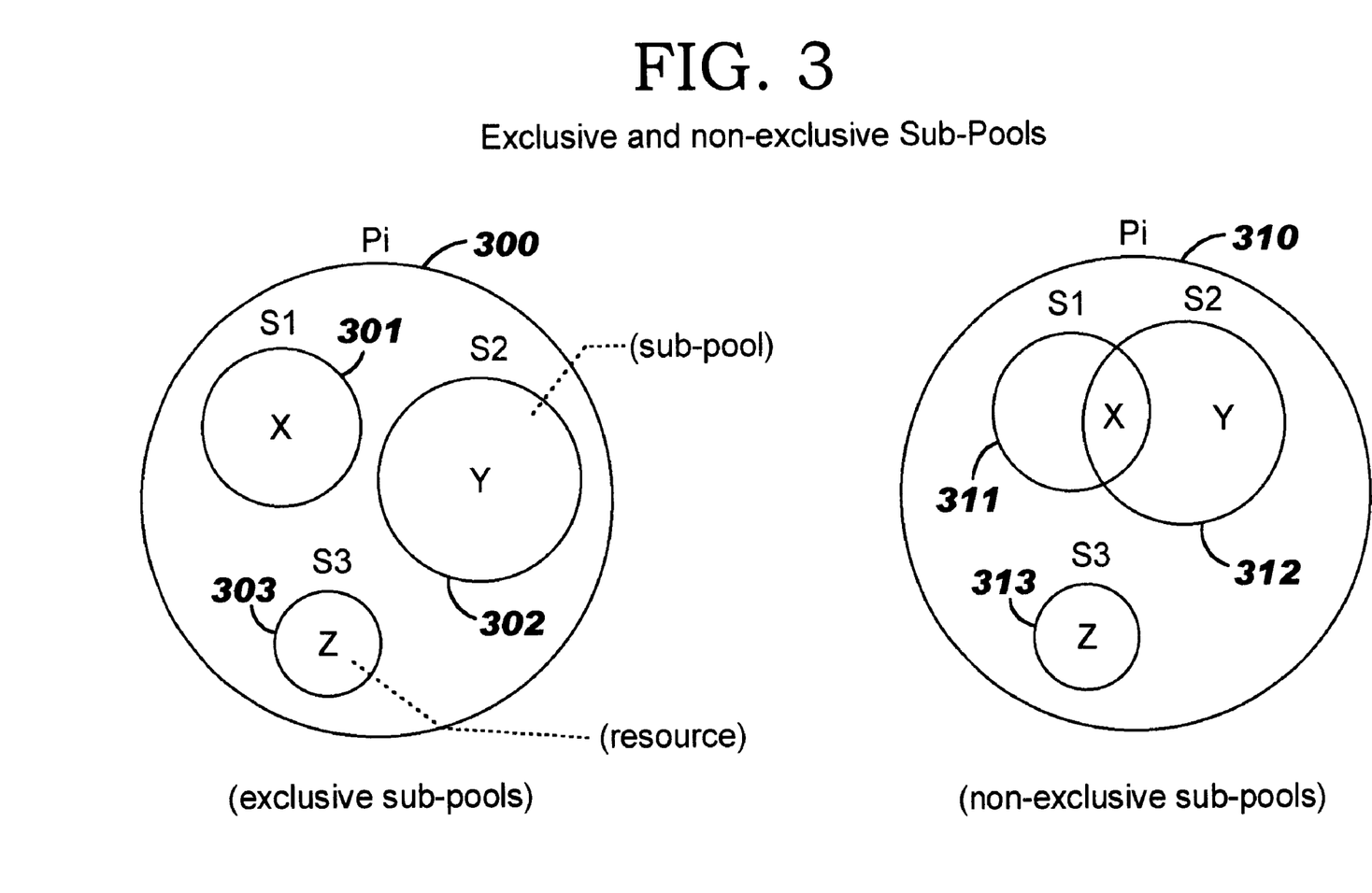
FIG. 3 illustrates the difference between exclusive and non-exclusive sub-pools and resource pools.

FIG. 3 illustrates the difference between exclusive and non-exclusive sub-pools and resource pools. In this example $P_i$ 300 is a resource pool with sub-pools S1 301, S2 302, and S3 303.

In the exclusive sub-pool case, there is no overlap among sub-pools. $P_i$ 310 is a resource pool which demonstrates the non-exclusive sub-pool case, sub-pools S1 311 and S2 312 have a non-empty intersection (i.e., resource "X"). Mixing types of sub-pools is also permitted, e.g., in the non-exclusive sub-pools illustration in FIG. 3, sub-pool S3 313 is exclusive while S1 311 and S2 312 are non-exclusive.

There are three distinct aspects to the definition and use of a resource pool (or sub-pool): the pool declaration, the population of the resource pool, and the association between a parameter and a pool. The last two aspects are detailed below followed by the specification for resource pool declarations and some examples.

II. How the Main Structural Elements are Utilized

A. Pool Population

Figure 4:
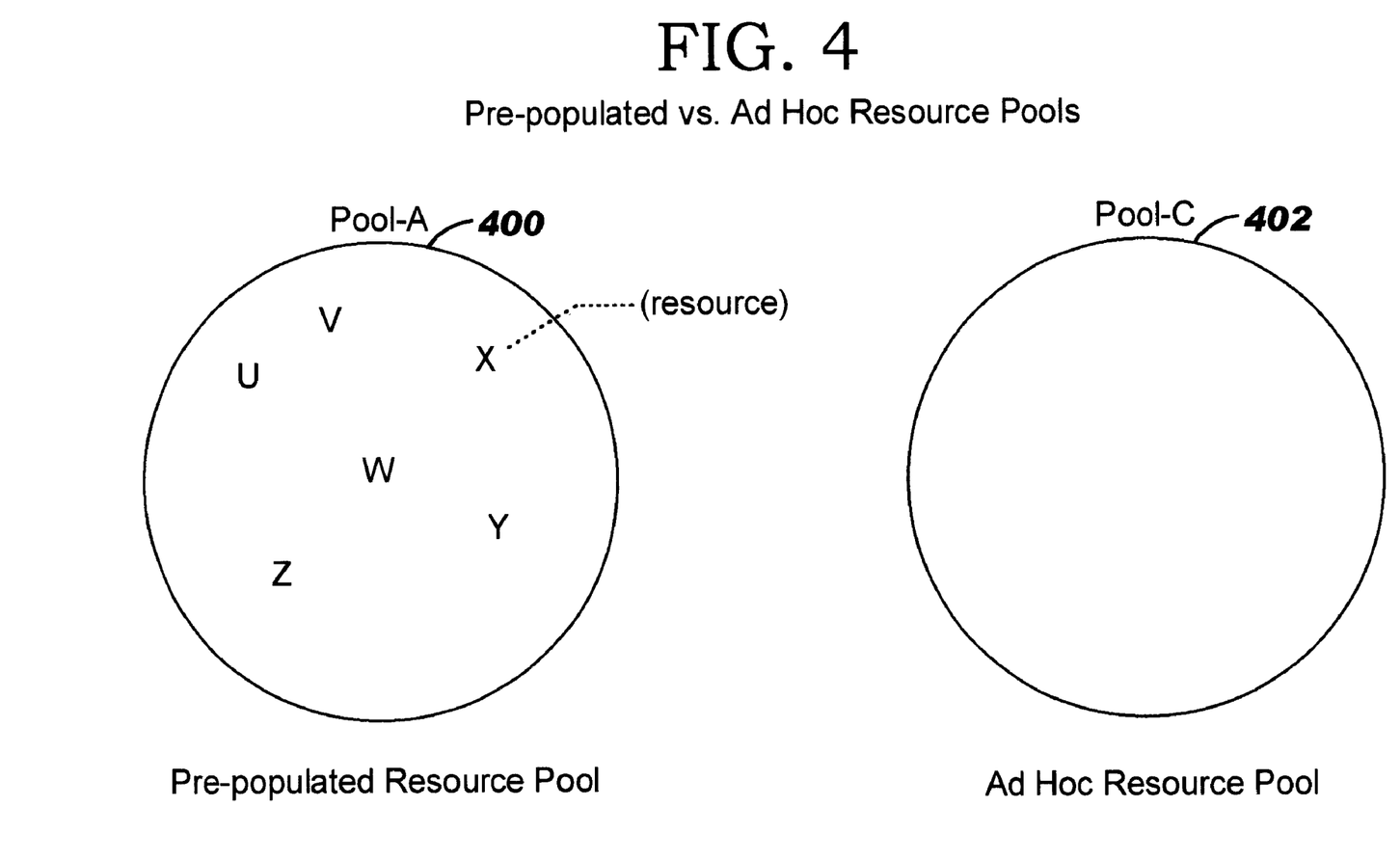
FIG. 4 shows that resource pools can be populated with resource in different ways, such as by pre-population (predefined) or incremental addition.

As illustrated in FIG. 4, resource pools can be populated in different ways. That is, the members of the resource pool can be pre-populated (predefined) or added incrementally. The resources associated with the given pool can be assigned to it at one time (to be allocated later) or they can be accumulated over time as the end-user enters parameter values. In the first case, pre-populated resource pool 400 shows that the resources in the resource pool are pre-populated. In the second case, the ad hoc resource pool 402 demonstrates that the resource pool population is Ad Hoc since the resources are to be added incrementally. Note that this distinction is not between different types of resource pools but between different ways in which a given resource pool can be populated. It is also possible for a resource pool to be partially pre-populated and to allow incremental population as well.

Pre-populated resource pools can be either user-defined or static (i.e., predefined in a Configuration Specification file). Typically, a resource pool will be pre-populated by end-users. For example, a resource pool for user-defined type-length values (TLVs) would have to be pre-populated by an end-user. Similarly, resource pools for IP addresses, ESIs, etc. would-be pre-populated by an end-user. Static resource pools represent a special case of pre-populated resource pools that contain a fixed set of values that are, in effect, pre-allocated to a resource pool and cannot be unallocated. That is, no value is allocated to any one parameter but can be referenced by multiple parameters. For example, a static resource pool for predefined TLVs could be defined and values could be assigned to those parameters for which a TLV is a valid value. Static pools provide a mechanism that allows any fixed set of constant values to be easily reused for different configurable component types. Ad hoc resource pools are initially empty and then populated incrementally. For example, the set of ELAN names in an enterprise is a resource pool that is populated as the end-users enter new ELAN names. Ad hoc resource pools allow end-users to benefit from resource management even when they choose not to pre-populate resource pools.

Specifically, ad hoc pools are initially empty and, as the end-user enters values for associated parameters, resources are added. When a resource is added to a sub-pool it automatically becomes a member of any ancestor sub-pools in the sub-pool hierarchy. For example, in FIG. 3, when the resource "X" is added to sub-pool S1 301, it also becomes a member of pool $P_i$ 300.

The effective propagation of resources to higher levels of the resource hierarchy is required to maintain the relationship between a resource pool and its sub-pools. That is, each sub-pool is defined as a subset of its containing pool. Therefore, the resources in the containing pool must be the union of all the resources and its sub-pools.

Figure 5:
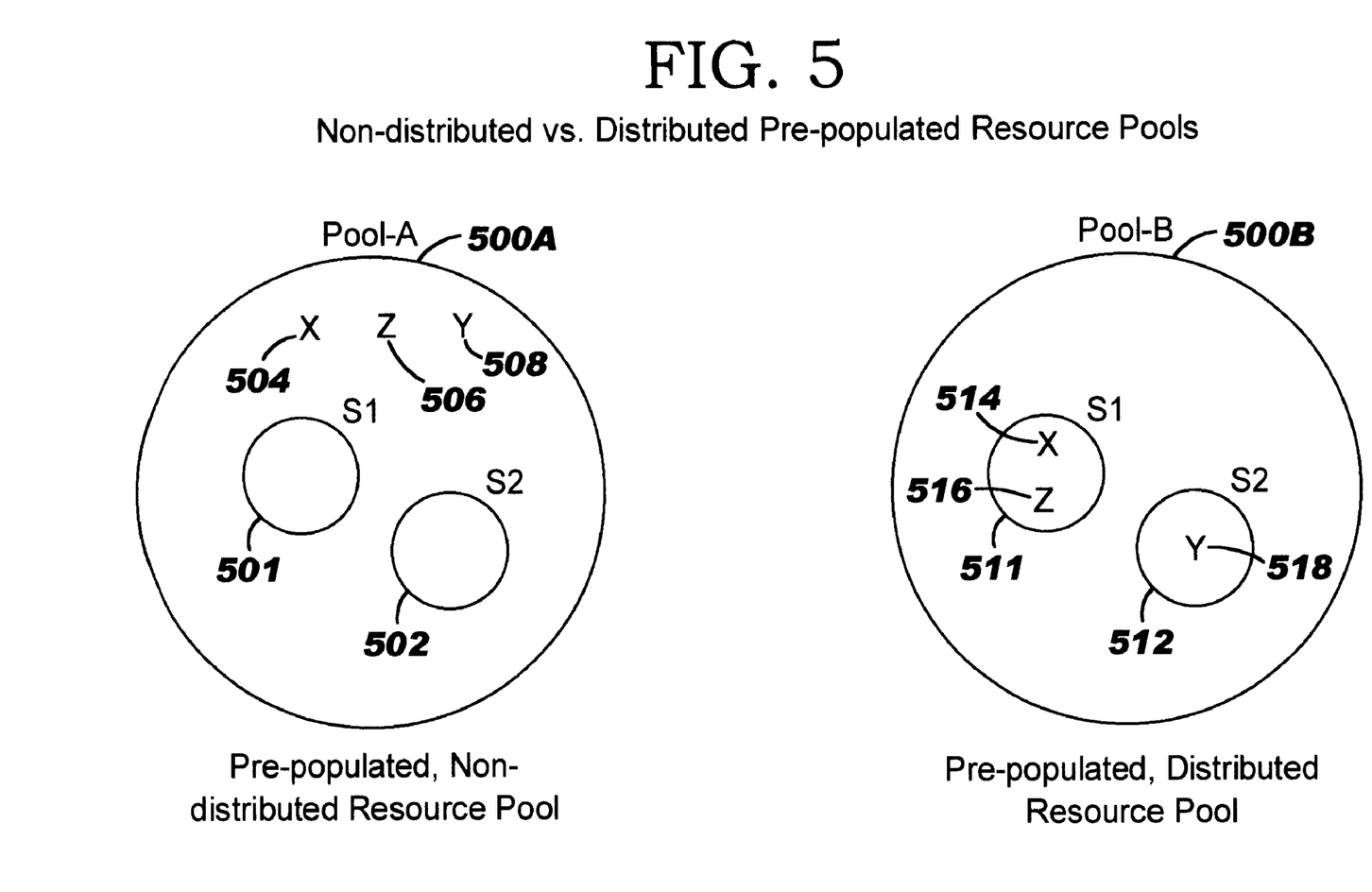
FIG. 5 shows that pre-populated resource pools can be further distinguished as being either distributed or non-distributed.

Pre-populated resource pools are further distinguished as being either distributed or non-distributed. As illustrated in FIG. 5, a non-distributed, pre-populated resource pool (Pool-A 500A) is one where the resources X 504, Y 506, and Z 508 are not distributed among the sub-pools S1 501 and S2 502 at the time of their creation. A pre-populated, distributed resource pool (Pool-B 500B) is one where resources X 514, Y 516, and Z 518 are distributed among the sub-pools S1 511 or S2 512, respectively, of resource pool 500B and the distribution occurs when the resource pools are created. In the case of non-distributed pools (e.g., 500A), later allocation operations will cause resources to be distributed among the sub-pools. For example, if resource X 504 is allocated to a parameter that is associated with sub-pool S1 501, then resource X 504 will become a member of S1 501 as well as a member of Pool-A 500B.

Non-distributed pools provide a simple mechanism whereby a set of resources can be incrementally distributed among various sub-pools. As with ad hoc pools, the relationship between sub-pools and their containing pool must be maintained. Thus, when a resource is selected from a pool and becomes a member of a sub-pool it must also become a member of any intervening sub-pools in the pool hierarchy.

B. Pool Associations

A pool can be associated with a parameter of the same type (as the pool) or with a configurable component, including the device. These two types of associations control resource assignment and pool creation, respectively. These associations are specified in the Configuration Specification file.

C. Resource Assignment

A pool reference is a many-to-one association between a configuration parameter and a resource pool. The association is used to determine the set of resources that may be assigned to the parameter. In some cases, the assignment of a resource to a parameter constitutes allocating that resource. For example, the "Router ID" (IP address) parameter must be allocated a unique IP address. This type of parameter and resource pool allocation is referred to as an "allocate-assignment."

In the other cases, the assignment of a resource to a parameter constitutes selecting a previously allocated resource. For example, the "Neighbor IP Address" parameter for OSPF should be assigned the address of an existing device (i.e., an address that has already been allocated). The type of parameter and resource pool association is referred to as a "reference assignment."

Note that when a resource pool is associated with a parameter (e.g., the ELAN name for a LAN Emulation Client (LEC)), it can be used to provide a list of known values for the end-user to select from or as the basis for duplicate detection if the end-user elects to enter a value. For example, when the end-user enters the first ELAN name, it is added to the pool associated with that parameter. The next time an ELAN name is required the end-user may choose to select a value from the list of known ELAN names or to enter a new name which is then added to the pool.

III. How the Main Structural elements are Created and Maintained

A. Pool Creation

While some resource pools are global in scope they may contain sub-pools with the scope of a single device instance. For example, a global pool of ESIs could be partitioned into one exclusive sub-pool for each device or ATM port. Since the number of required sub-pools cannot be determined beforehand, it is necessary to allow such sub-pools to be created dynamically. That is, some sub-pools must be created when a device or component of a given type is created during the configuration process.

Dynamically created sub-pools are distinguished by their association with a device or configurable component specification instead of with a parameter. The details of such specifications are described below.

B. Allocation Policies

As noted above, the assignment of a resource to a given parameter depends on the parameter assignment classification, i.e., an "allocate" or a "reference" assignment. However, this information is insufficient for determining the appropriate behavior of the configuration tool when a user chooses to assign a value to a given parameter. The required behavior is referred to here as the "allocation policy." Determining which allocation policy to apply in a given situation is determined by a combination of the known parameter assignment classification and the action taken by the user (i.e., entering a value or using the right mouse button to request a list to values from which to select).

The following describes the allocation policies that can be used to assign a resource to a parameter that has been selected by the user. A parameter may be selected (for resource allocation purposes) by the user either directly (e.g., selecting a device specific parameter in a configurable component) or indirectly (e.g., by selecting a device specific parameter and indicating that values for the parameter are to be automatically allocated).

Auto-allocate—automatically allocates a resource to be assigned to the selected parameter. In the case that the parameter is common to a set of configurable objects, the equivalent device specific parameter for each configurable object is assigned a separately allocated resource.

Select-Allocated—based on the selected parameter, the tool will list the appropriate set of previously allocated resources for selection by the user. The selected resource is then assigned to the selected parameter.

Select-Unallocated—based on the selected parameter, list the appropriate set of unallocated resources for selection by the user. The selected resource is then assigned to the selected parameter.

Enter-Allocated—allow the user to enter a value for the selected parameter and then verify that it is a previously allocated resource.

Enter-Unallocated—allow the user to enter a value for the selected parameter and then verify that it is an unallocated a resource.

Auto-Allocated-by-Device—the resource for the selected parameter is to be assigned by the device itself (e.g., an ESI). This type of assignment is represented in the configuration tool by a special value (e.g., "Burned-In ESI"). Note that this special value cannot be classified as either allocated or unallocated.

The allocation policy to use for a given parameter is determined by a combination of end-user actions and the allocation classification of the parameter as declared in a Configuration Specification file. These concepts are elaborated upon below.

If the user enters a value directly into an entry field then the policy must be either Enter-Allocated or Enter-Unallocated. If the user selects a value (from a menu, list, or other widget) then the policy must be Select-Allocated, or Select-Unallocated. If the user selects a special value as described under the 'Auto-Allocate-by-Device' section above the policy is Auto-Allocate-by-Device. Finally, if the user has enabled automatic allocation then the policy is Auto-Allocate.

Only in the first two cases does there need to be further information in order to determine which policy to use. The additional information required is supplied by the parameter assignment classification as described above. Table 1 indicates which allocation policies are followed for each of the two parameter assignment classifications:

TABLE 1

Parameter Allocation Classification Based on User Action and Allocation Policy.

| | | Parameter Assignment Classification | |
|---|---|---|---|
| User Action | Allocation Policy | Allocate | Reference |
| None | Auto-Allocate | X | — |
| Select | Select-Allocated | — | X |
| | Select-Unallocated | X | — |
| | Auto-Allocated-by-Device | — | X |
| Enter | Enter-Allocated | — | X |
| | Enter-Unallocated | X | — |

Note that each combination of user action and parameter assignment classification uniquely identifies an allocation policy.

C. Resource Management Declarations

As described above, there are two distinct types of declarations required to effect resource management. The first is to declare the resource pool or pool hierarchy and the second is to declare the various resource pool associations. Together, they specify a set of resources (possibly initially empty) and the parameters that can be assigned or reference those resources.

D. Resource Pool Declarations

A pool declaration serves to establish the pool name, value type, and scope of a pool. Pool names are globally scoped since they may be referenced by different configurations for different device types. The value type of the pool is the name of a predefined data type that can be used to validate resources entered by the user. The scope of the pool is similar to the notion of lexical scope in most procedural programming languages and is used as part of the specification of uniqueness constraints.

The basic syntax for pool declaration follows.

```
<pool> ::= "POOL: " <pool_name> <value_type> <description>
    "[" <sub_pools> "]"
<sub_pools> ::= /* empty */
    |   <sub_pools> <sub_pool>
<sub_pool> ::= <sub_pool class> <pool_name> <description>
    "[" <sub_pools> "]"
<sub_pool_class> ::= :EXCL_POOL:" /* exclusive sub-pool */
    |   "SUB_POOL:" /* non-exclusive sub-pool */
<value_type> ::= /* valid MIB variable type */
<static_def> ::= <pool_name> "=" "{" <pool_values> "}"
```

```
<pool_values> ::= <value>
    |   <pool_values> "," <value>
```

Note that sub-pool declarations do not include a value type since they must be the same type as the enclosing pool. Note also that static pools as described above are created by simply providing a static definition of its members. Otherwise, there is no distinction between static pools and any other type of pool.

The following is a somewhat contrived example of the pool declaration that might be used for ESIs.

```
POOL: ESIs ESI        "ATM ESI"
[
    EXCL_POOL: Port_ESIs       "ATM Interface ESIs"
    [
        SUB_POOL: LANE_ESIs "LANE ESIs"
        SUB_POOL: CIP_ESIs "Classical IP ESIs"
        EXCL_POOL: Red_ARP_Server_ESIs    "Redundant ARP
        Server ESIs"
    ]
]
```

In this example, the pool "ESIs" contains an exclusive sub-pool ("Port_ESIs") which contains two non-exclusive sub-pools and one exclusive sub-pool. This allows the same ESI to be used for either LANE or Classical IP parameter values but not for redundant ARP servers.

The Port_ESIs sub-pool will be the basis for dynamically created sub-pools as described earlier. That is, the Port_ESIs sub-pool will be associated with an ATM port configurable component specification. Thus, whenever an ATM port component is created during configuration, an associated Port_ESIs sub-pool will be created automatically.

If the product developer wished to further refine the ESI pool hierarchy above so that ESIs used for different LANE elements could be differentiated, they could expand the LANE_ESIs sub-pool declaration as follows.

```
SUB_POOL: "LANE_ESIs"
[
    EXCL_POOL: LECS_ESI "LECS ESIs"
    EXCL_POOL: LES_BUS_ESI      "LES/BUS ESIs"
    EXCL_POOL: LEC_ESI "LEC ESIs"
]
```

This would create an exclusive sub-pool for each LAN element. Note that since LANE_ESIs sub-pool is non-exclusive as is the CIP_ESIs sibling sub-pool, an ESI assigned to an LES could still be used in Classical IP.

E. Pool Association Declarations

As previously described, there are two distinct types of pool associations. One is the association of a pool with a device or configurable component to indicate the need for dynamic pool creation. The other is the association of a pool with a configuration parameter along with an indication of whether the assignment classification is "allocate" or "reference." For the first type of pool association, the declaration consists of the name of the pool to be associated with the device component and a limit on the maximum number of resources that are allocated in the resource pool. Note that this is different from the case where a limit is imposed by the number of resources in a pool. That is, the user can add more resources to an "exhausted" pool but the limit on a pool cannot be exceeded.

The syntax for dynamic pool creation associations follows.

```
<dynamic_pool_clause> ::= "NEW_POOL:" <pool_name>
<pool_limit>
<pool_limit> ::= /* maximum number of resources for this
pool */
```

For the second type of pool associations, the declaration consists of an indicator of the assignment classification and the name of the resource pool that is to be associated with the given parameter. Specifically, the syntax for this type of clause is as follows.

```
<assignment_pool_clause> ::= "REF_ALLOC_POOL" <pool_name>
                | "REF_UNALLOC_POOL" <pool_name>
Examples of pool clauses:
CCT: ATM_Port
NEW_POOL: Port_ESIs /* Create a new Port_ESIs pool for each
port */
CCT: LEC
    PARAMETER: Locally_Administered_ESI
        /* Display Port ESIs not used in Red ARP pool and
        add ref to ESI in LANE pool */
        REF_ALLOC_POOL: LANE_ESIs
CCT: CIP_Redundant_ARP_Server
    PARAMETER: ESI
        /* Display Port ESIs not used elsewhere and add
        ref to Red ARP pool */
        REF_ALLOC_POOL: Red_ARP_Server ESIs
```

The foregoing has identified the main structural elements utilized by embodiments of the present invention, how those main structural elements are utilized, and how those main structural elements are created and maintained. The following will discuss yet further embodiments whereby users can interface with the method and system in order to achieve efficient network management.

IV. Resource Management Facility (Administrator Interface)

Although resource pools cannot be created by the end-user, there is a need for a resource management facility that provides the end-user with the following functions: (1) view resource pools and their contents; (2) populate resource pools; (3) locate resource references; and (4) view and add resource aliases.

A. View Resource Pools and Their Contents

This includes viewing resource pool hierarchies and easily distinguishing between ad hoc and pre-populated pools and between allocated and unallocated resources.

B. Populate Resource Pools

The user can pre-populate resource pools at any time using either of two basic types of specifications: ranges or enumerations. A range specification is simply a set of one or more ranges of values (e.g. 0–99 or 0–255) indicating that the resource pool is to be populated with values in the given ranges. An enumeration specification is an explicit set of values (e.g., {A, B, X, Y}) that are to be used as the members of a given resource pool. There should also be a mechanism whereby the user can select an ASCII file containing either type of specification to be read in by the tool rather than requiring the user to manually enter the specifications.

The advantages of allowing pool population via an ASCII file are that the file can be generated by scripts, easily edited, compared with other such files, and shared with other users.

When populating a pool, the resource is added to a pool if it does not already exist in the pool. Pools are not automatically purged before populating them from a file.

C. Locate Resource References

Locate configurable components, and their associated devices, that reference a given resource. A distinction must be made between allocate versus reference parameters. This allows end-users to easily locate the device that has been allocated the resource separately from the devices that reference the resource.

D. Resource Aliases

A given resource may be assigned an alias, e.g., an ATM address may be associated with a string such as "ELAN-X-LES-Address".

Note that (a) the alias is associated with a specific resource object and not an arbitrary string; (b) the alias has a scope (the pool containing the resource associated with the alias); and (c) all users will see the same aliases (they're not created on a per-user basis).

For an "allocate" parameter, the value assigned must not be a resource that has already been assigned. Therefore, the assigned value (a) will not have been associated with any other component before or with an alias; (b) could be automatically associated with the configurable component type and device as an alias (e.g., "8210-BB:LES.3") which could be overridden by the user; and (c) is now marked as allocated and will be displayed when its pool (or any pool above its pool) is referenced by some "reference" parameter.

For a "reference" parameter, the value assigned must be a resource that has already been allocated. The user will be shown the list of previously allocated values that are in the relevant pool hierarchy. The values shown can be toggled between (a) actual value (e.g., an ATM address); (b) user-supplied alias (e.g. "ELAN-X-LES-Address"); or (c) systems supplied alias (e.g., "8210-BB:LES.3").

While the invention has been shown and described with reference to particular embodiments thereof, it will be understood by those skilled in the art that the foregoing and other changes in form and detail may be made therein without departing from the spirit and scope of the invention, which is defined only by the following claims.

What is claimed is:

1. The method for operating a network having a plurality of devices, said method comprising the steps of:

adding a plurality of network resources to a plurality of homogenous resource pools, wherein each of said network resources is a set of values that may be assumed by a configuration parameter associated wit one of said devices, including: MAC, IP and ATM addresses, ELAN names or host names, and wherein all network resources in each one of said plurality of homogenous resource pools conforms to a particular classification;

determining whether or not a selected network resource of a particular classification is available by determining said selected network resource's membership within a particular one of said plurality of homogenous resource pools;

in response to said selected network resource being available, assigning said selected network resource to said configuration parameter; and thereafter, operating said network in conformity with said assignment.

2. The method according to claim 1, wherein said adding step further comprises the step of adding a plurality of network resources to a plurality of sub-groups of homogenous resource pools, and wherein said step of determining is further performed by determining said selected network resource's membership within a particular one of said plurality of sub-groups of homogenous resource pools.

3. The method according to claim 1, wherein said adding step further comprises the step of pre-populating said plurality of homogenous resource pools of network resources.

4. The method according to claim 1, wherein said adding step further comprises the step of dynamically populating said plurality of homogenous resource pools of network resources.

5. The method according to claim 1, wherein said step of assigning is performed automatically, wherein said assignment is made without user input.

6. A network comprising:
  a plurality of devices interconnected through network interface means, said plurality devices including a plurality of processing elements;
  means for adding a plurality of network resources to a plurality of homogenous resource pools, wherein each of said plurality of network resources is a set of values that maybe assumed by a configuration parameter associated with one of said devices, including: MAC, IP and ATM addresses, ELAN names or host names, and wherein all network resources in each one of said plurality of homogenous resource pools conforms to a particular classification; and
  means for determining whether or not a selected network resource of a particular classification is available by determining said selected network resource's membership within a particular one of said plurality of homogenous resource pools, and for further assigning said selected network resource through said configuration parameter if said selected network resource is available, wherein said plurality of devices is operated in conformity with said assignment.

7. The network according to claim 6, wherein said added means further adds a plurality of network resources to a plurality of sub-groups of homogenous resource pools of network resources, and wherein said determining means further determines whether or not a selected network resource of a particular classification is available by determining said selected network resource's membership within a particular one of said sub-groups of network resources.

8. The network according to claim 6, wherein said adding means further comprises means for dynamically populating said one or more homogenous resource pools of network resources.

9. The network according to claim 6, wherein said adding means further comprises means for pre-populating said one or more homogenous resource pools of network resources.

10. The network according to claim 6, wherein said assigning means, said determining means and said selected means operate without user input.

11. A computer program product for use in a network comprising a plurality of processing components comprising signal-bearing media containing program instructions for execution on at least one of said processing components, said program instructions for performing the steps of:
  adding a plurality of network resources to a plurality of homogenous resource pools, wherein each of said network resources is a set of values tat may be assumed by a configuration parameter associated with one of said devices, including: MAC, IP and ATM addresses, ELAN names or host names, and wherein all network resources in each one of said plurality of homogenous resource pools conforms to a particular classification;
  determining whether or not a selected network resource of a particular classification is available by determining said selected network resource's membership within a particular one of said plurality of homogenous resource pools;
  in response to said selected network resource being available, assigning said selected network resource to said configuration parameter; and
  thereafter, operating said network in conformity with said assignment.

\* \* \* \* \*